United States Patent [19]

Weatherly

[11] 4,173,685

[45] Nov. 6, 1979

[54] COATING MATERIAL AND METHOD OF APPLYING SAME FOR PRODUCING WEAR AND CORROSION RESISTANT COATED ARTICLES

[75] Inventor: Merle H. Weatherly, Indianapolis, Ind.

[73] Assignee: Union Carbide Corporation, New York, N.Y.

[21] Appl. No.: 908,623

[22] Filed: May 23, 1978

[51] Int. Cl.$^2$ .............................................. B05D 3/06
[52] U.S. Cl. .................................... 428/556; 75/238; 75/254; 427/34; 427/190; 427/191; 427/423; 428/551; 428/558; 428/564; 428/935
[58] Field of Search ................ 427/34, 423, 190, 191, 427/199, 133, 113; 75/251, 254, 238; 428/555, 556, 558, 564, 551

[56] References Cited

U.S. PATENT DOCUMENTS

| | | |
|---|---|---|
| 1,342,801 | 6/1920 | Gebauer. |
| 2,401,221 | 5/1946 | Bourne. |
| 2,581,252 | 1/1952 | Goetzel et al. |
| 2,612,442 | 9/1952 | Goetzel. |
| 2,752,666 | 7/1956 | Goetzel et al. |
| 2,875,043 | 2/1959 | Tour. |
| 2,899,338 | 8/1959 | Goetzel et al. |
| 2,936,229 | 5/1960 | Shepard .................................. 75/170 |
| 2,942,970 | 6/1960 | Goetzel et al. |
| 3,025,182 | 3/1962 | Schrewelius. |
| 3,305,326 | 2/1967 | Longo ..................................... 427/34 |
| 3,341,337 | 9/1967 | Quaas et al. |
| 3,743,556 | 7/1973 | Breton et al. |
| 3,936,295 | 3/1976 | Cromwell et al. |
| 4,013,453 | 3/1977 | Patel. |
| 4,075,371 | 2/1978 | Patel. |

OTHER PUBLICATIONS

"Metal Progess" V 112, No. 6, Nov. 77, p. 49.
"Nippon Tungsten Review" vol. 1, Sep. 1974, pp. 54–58.
"Nippon Tungsten Review" vol. 9 (1976), pp. 58–63.

*Primary Examiner*—John H. Newsome
*Attorney, Agent, or Firm*—Dominic J. Terminello

[57] ABSTRACT

Wear and corrosion resistant coatings are obtained using the plasma or d-gun techniques and applying a coating material consisting of carbides and nickel-containing base alloy having 6–18 wt.% boron.

21 Claims, No Drawings

COATING MATERIAL AND METHOD OF APPLYING SAME FOR PRODUCING WEAR AND CORROSION RESISTANT COATED ARTICLES

This invention relates to wear and corrosion resistant coating materials, methods of applying them and the resulting coated articles. More particularly, this invention relates to coating materials containing nickel base alloys and metal carbides which are reacted in situ to form a coating that is completely sealed and provides excellent wear resistance.

Throughout this specification, reference will be made to plasma and d-gun techniques for depositing coating compositions. Typical plasma deposition techniques are described in U.S. Pat. No. 3,016,447, issued Jan. 9, 1962. D-gun (detonation-gun) techniques are described in U.S. Pat. No. 2,714,563, issued Aug. 2, 1955. The disclosure of such techniques are incorporated herein by reference.

BACKGROUND OF INVENTION AND STATE-OF-THE-ART

Many industrial applications have increasing requirements for superior wear and corrosion resistant surfaces. This is particularly true in the case of abrasive wear in a corrosive environment. Solid, sintered tungsten carbide-cobalt or similar solid, sintered materials with very high hardnesses have been used successfully as solid components or as inserts in some applications, but in many situations their use is impractical because of their lack of structural toughness, high cost or fabrication difficulties. In such situations the only practical solution is an overlay or coating on a metallic substrate. Weld-deposited hard facing compositions are the most common type of overlays that are used in abrasive environments. A variety of welding techniques are used to deposit these materials, but oxygen-acetylene welding or flame spraying using wire, rod or powder is probably the most widely used. A common technique is to deposit the materials in one or more welding passes and then subsequently remelt or fuse the deposit with the same or a different welding torch, or, in some cases, by furnacing. All of the welding techniques involve some melting of the substrate surface and hence dilution of the deposit with substrate metal.

The most commonly used hard facing compositions are tabulated by the American Society for Metals (ASM) in Metal Process, Vol. 112, No. 6, Nov. 1977, p. 49. The ASM class 5 hard facing materials containing 75 to 96 weight percent (all compositions hereinafter are given in weight percent) tungsten carbide as unmelted crystals or grains in a cobalt-base alloy are the most wear resistant, but are generally very brittle with poor mechanical shock resistance and are difficult to apply without cracking, excessive oxidation, etc. The next most abrasion resistant hard facing materials are the ASM class 4 alloys consisting of Ni (nickel) and Co (cobalt) base alloys. The Co-base alloys of sub-class 4A contain W (tungsten) and C (carbon) in solution and hence may form a limited volume fraction of tungsten carbide by precipitation during cooling. These overlays, as well as those of class 5, are usually applied using a flux covering, inert gas shrouding or some other means to minimize oxidation during deposition and subsequent fusing. The Ni-base alloys of sub-class 4B are known as "self-fluxing" alloys and contain B (boron) and Si (silicon) to form their own flux. During initial deposition or post deposition remelting, most of these fluxing elements combine with the metal oxides and float to the surface of the deposit forming a slag. Although the self-fluxing alloys are normally used by themselves, they are occasionally combined in a mixture with unmelted tungsten carbide grains to improve the toughness of the class 5 hard facing alloys. A recent example is that of Patel U.S. Pat. Nos. 4,013,453 and 4,075,371, in which a nickel-base alloy containing 0.5 to 5 B and 0.5 to 6 Si is mixed with a WC-Ni agglomerate and flame sprayed. Patel intentionally avoids significant reaction between the WC particles and the metallic matrix to preserve the initial powder size and distribution of WC grains.

The most commonly used self-fluxing alloys contain up to 3.5 B and up to 4.5 Si. Ni-base alloys with up to 6 B and Si are taught by Tour in U.S. Pat. No. 2,875,043 for the special case of the alloys of his invention which contain, in addition, 3 to 10 Mo (molybdenum) and 3 to 8 Cu (copper). The latter presumably increases the fluidity of these otherwise conventionally used self-fluxing alloys. He does not teach the use of these alloys with a carbide hard phase or for any other purpose than oxygen-acetylene spray welding including remelting.

Quaas in U.S. Pat. No. 3,341,337 teaches the admixture of boric acid to Ni, Co or Fe (iron) base flame spray powder (oxygen-acetylene hard facing), with or without an admixture of tungsten carbide grains, to prevent oxidation during deposition. Most of the boric acid is intentionally lost by vaporization or as slag. It is not intended to react with or form part of the deposit.

Schrewelius in U.S. Pat. No. 3,025,182 teaches the production of a nonporous corrosion resistant coating by oxygen acetylene flame spraying of a mixture of a metal and 2 to 40 B or boron containing compound. He specifically teaches that both components have a melting point greater than 1300° C. and that most of the boron is volatized as boric acid as a result of its fluxing action. This is particularly important, he teaches, since B is often detrimental to the final deposits.

Noguchi, et al. in *Nippon Tungsten Review*, Vol. 1 (Sept. 1974) pages 54 to 58 have described a variant of the normal WC (tungsten carbide) self-fluxing mixture for oxygen-acetylene spraying, namely a prealloyed powder containing greater than 25 WC, 8 to 12 Cr (chromium), 2 to 4 Fe, 5 to 6 (B+Si+C), balance Ni. The specific amount of B, Si and C is unspecified and presumably could be zero for any one. Although dense coatings are reported with better wear resistance than self-fluxing alloys blended or mixed with WC, the hardness of the coatings (less than 1000 $DPH_{300}$) (all hardness values hereinafter given in $kg/mm^2$ as measured on the diamond pyramid hardness scale with a 300 g load), is still lower than conventional detonation gun (d-gun) WC–C. coatings.

In spite of all the effort that has been expended on weld-deposited hard facing overlays or coatings, none have approached the sintered tungsten carbides in wear resistance. Nonetheless they are widely used where the sintered products cannot be applied.

Another type of material, plasma and d-gun coatings, has been used for many years for wear-resistant applications requiring only relatively thin coatings, usually 0.002 to 0.020 inches thick, and moderate hardness, up to about 1200 $DPH_{300}$ but usually less than 1000 $DPH_{300}$. One of the most useful classes of compositions for this purpose has been the family of tungsten carbide-cobalt coatings (usually with 10 to 25 wt.% cobalt). As with all as-coated plasma and detonation gun coatings, these tungsten carbide-cobalt coatings have some interconnected porosity. This porosity reduces the corrosion resistance of the coating and, to some degree, its wear resistance, particularly its abrasive wear resistance. Thus, while these coatings are used very successfully in a wide variety of adhesive wear situations, they have been used with much more limited success in severe abrasive environments.

Compositions similar to the self-fluxing hard facing alloys have been adapted for plasma deposition where they are generally used without post deposition fusion of the coating. They simply increase the fluidity of the molten powder particles as they impact on the surface being coated and potentially facilitate particle-to-particle bonding through a localized fluxing action. The result is presumably a denser, stronger coating with less interconnected porosity. Typical compositions for this kind of an application contain boron, silicon or phosphorus both to act as a reductant (fluxing agent) and to lower the melting point and increase the fluidity of the metals used as in the case of hard facing self-fluxing alloys. Boron is usually present up to about 3.5 wt.% and silicon up to about 4 wt.%. Phosphorus is used less frequently than boron or silicon. While some success has been achieved in plasma deposition in increasing the density and strength of the deposits by using these so-called self-fluxing compositions, complete sealing has not been achieved and no substantial strengthening due to the formation of new phases containing silicon or boron has been noted.

The use of the same self-fluxing alloys mixed with a tungsten carbide-cobalt powder for plasma deposition of a coating is also known in the art. As in the case of use of self-fluxing alloys by themselves, the plasma sprayed mixed coatings are not remelted or fused after deposition, and again the purpose of the self-fluxing component is to increase fluidity in an attempt to reduce porosity and to act as a localized reductant. A particularly complex plasma sprayed coating is taught by Cromwell, et al., in U.S. Pat. No. 3,936,295 that consists of a tungsten carbide-Co component (15 to 39 wt.%), nickel-aluminum (0 to 10.5 wt.%) and nickel-molybdenum (26.7 to 85 wt.%) alloys and a self-fluxing alloy (0 to 47.8 wt.%). The basis of this invention is the inclusion of the exothermically reacting Ni—Al and Ni—Mo components. Although a non-essential component of the invention, the self-fluxing alloy, when used, contains 2.75 to 4.75 B and 3.0 to 5.0 Si with these elements performing their usual self-fluxing action.

A variety of methods have been attempted in an effort to fill or infiltrate the porosity of various coatings or other porous bodies. For example, the porosity in plasma or d-gun coatings has been filled with various organic compounds (such as epoxies) to improve corrosion resistance at low temperature; however, at about 260° C. or less, these materials decompose and lose their efficacy as a sealant. Moreover, these sealants can only penetrate the coating with difficulty and seldom completely seal the full thickness of the coating. They add very little, if any, mechanical strength to the coating and have been shown to add virtually nothing to the abrasion resistance of the coating.

Goetzel, et al., in U.S. Pat. Nos. 2,942,970, 2,581,252 and 2,752,666 teaches a method of producing a carbide structural body (not a coating) by first producing a very porous skeleton (30 to 70 percent porosity, higher than can be obtained by plasma or d-gun) of the carbide with a low fraction of metallic binder and then infiltrating this skeleton with a ductile, heat and corrosion resistant Ni, Co or Fe base alloy. There is no mention in the reference of the use of B, Si, or P (phosphorus) in the infiltrant and, by necessity, they must be excluded in any substantial amount to satisfy the requirement of heat resistance and high ductility. Goetzel, et al., in U.S. Pat. No. 2,612,442 teaches a corrosion resistant coating of Cr, Zr (zirconium), Al (aluminum) or Si, for the preceding, fully infiltrated carbide bodies, principally by pack cementation. In another method of coating these fully infiltrated bodies, Goetzel et al. in U.S. Pat. No. 2,899,338 teaches a coating made by first coating the fully dense, infiltrated carbide body with an undercoat or bond coat of an Fe, Co or Ni base alloy with 0–20 Mg (magnesium), 0–5 B, 0–12 P, 0–4 Si, 0–2 Mn (manganese) 0–2 C, the alloying elements not exceeding 20 percent of the total composition. This bond coat is then overcoated with a primary coating of the Ni-Cr type 4 to 10 times as thick as the undercoat, and the coated part heat treated to diffuse the bond coating into both the primary coating and the base material. B, Si and P are used primarily to lower the melting point of the bond coat to allow diffusion/infiltration of the primary coating without melting it. No reaction with the primary coating or base material is taught or the use of B, Si or P as other than a melting point depressant and there is no criticality of B, Si or P content other than enough to depress the melting point.

Breton, U.S. Pat. No. 3,743,556, uses a somewhat similar technique in that he first deposits an Fe, Ni or Co base alloy on a substrate, then a layer of "filler" material (diamond, WC, TaC, hard alloys, borides, etc.), both layers being held in place with an organic binder. On heating, the organic binder decomposes and the first layer melts and infuses the outer layer. Breton does not disclose any data characterizing his end product in terms of hardness or wear resistance. We have found that using techniques similar to those taught by Breton result in coating having a hardness less than 1000 $DPH_{300}$.

It is also known in the art that porous metal structures (not coatings) can be infiltrated with a lower melting metal; e.g., Gebaurer, U.S. Pat. No. 1,342,801, who simply used a metal of lower melting point or Bourne, in U.S. Pat. No. 2,401,221, who teaches the infiltration of porous compacted iron briquettes with copper presaturated with iron to minimize reaction.

OBJECT OF THE INVENTION

None of the preceding methods have, however, either singly or in combination provided completely satisfactory methods or materials to greatly improve the abrasive wear and corrosion resistance of coatings. It is the intent, therefore, of this invention to provide a unique coating system that is completely sealed, to provide corrosion protection, and has excellent wear resistance, approaching or equaling that of sintered solid tungsten carbide.

STATEMENT OF INVENTION

The invention is based on the discovery that such extremely wear and corrosion resistant coatings can be made by reacting unique Ni-base alloys with a variety of carbide based coatings in situ, and on the further discovery that the structure and hardness of the coating is dependent on a critical relationship of density to boron content, as more fully described hereinafter.

One embodiment of the invention resides in a method for producing wear and corrosion resistant coatings. There are two principal methods of producing the coatings of this invention although those skilled in the art may develop useful variants within the scope of the invention. One method, for convenience, designated the two-layer method, consists of first depositing by plasma or d-gun a layer of a metal carbide (with or without a metal binder), then depositing by a variety of means a second layer of a reactive Ni-base alloy and finally heat treating the coated article to cause the second layer to melt, penetrate the first layer and react with it. The second method, for convenience designated the one-layer method, consists of depositing, by plasma or d-gun, a mixture of a metal carbide (with or without a metal binder) and a Ni-base reactive metal and then heat treating the coated article to cause the reactive metal to melt and react with the metal carbide component. Either method can be used with Fe, Ni or Co base substrates. A limited amount of diffusion and/or reaction with the substrate occurs and increases the bond strength of the coating. It should be noted that the plasma or d-gun deposition techniques result in a layer having a density greater than 75 percent of theoretical.

Another embodiment resides in a novel powder as starting materials for providing the wear and corrosion-resistant coating of the invention. In the two-layer method of the invention, the first layer consists of a metal carbide which may be a tungsten, chromium, vanadium, hafnium, titanium, zirconium, niobium, molybdenum or tantalum carbide or mixtures or compounds thereof. The metal carbide may be used with up to 25 wt.% of a metal binder such as Co, Ni, Fe or their mixtures or alloys. The reactive metal of the second layer is a novel nickel base alloy with an unusually high boron content. The specific composition varies with the specific metal carbide, method of deposition and heat treatment time and temperature, but falls within the range of 3.0 to 18.0 B, 0 to 20 Cr, 0 to 6.0 Si, 0 to 5 Fe, balance Ni, when the density of the first layer in the two-layer method as deposited is greater than 95 percent of theoretical. The range of boron is 6.0–18.0 when the density is between 75 to 95 percent of theoretical. The metal carbide comprises 40 to 75 wt.% of the total composition of the two layers.

In the one-layer method the novel starting powder consists of a mixture of the metal carbide listed above and the reactive metals. (The metal carbide comprises 75 to 40 wt.% of the total composition).

Another embodiment of the invention resides in a coating on a substrate produced in accordance with the invention which has a hardness greater than 1000 DPH$_{300}$ and has no interconnected porosity.

The use of plasma or d-gun deposition for the first layer in the two-layer method is critical because it is necessary that this first layer have a density greater than 75 percent of theoretical (much greater than the porous bodies taught by Goetzel or the layer technique taught by Breton) to achieve a virtually fully dense final coating. The second layer in the two-layer method may be applied by plasma or d-gun deposition, as well, but may alternatively be applied by other methods such as slurries, electrophoresis, physical vapor deposition or sputtering. In the one-layer method plasma or d-gun deposition is critical to achieve an initial density of greater than 75 percent, again to insure a final structure that is substantially pore free and has requisite hardness. Standard powder methods such as slurries or electrophoresis cannot achieve this high a density. Physical vapor deposition cannot deposit carbides and sputtering techniques, though perhaps technically possible, would be impractical. This invention can, therefore, be distinguished from much of the prior art on the basis of the density of an initial layer alone.

The microstructures of the resulting coatings are very complex and depend on the specific composition and proportion of metal carbide, reactive metal and substrate. They are not fully understood. It is generally observed that the reactive metals of this invention not only wet the metal carbides (and penetrate the pores of the first layer in the two-layer method), but that they react with the metal carbides, drastically changing the composition and morphology of the total coating. This reaction may take the form of dissolution of the metal carbide followed by precipitation of new phases or, to some extent, the same phase in a new morphology, or it may involve a solid state reaction. Not only does a uniform distribution of carbides result, but a uniform distribution of borides and/or complex metal borocarbides. In addition, the coating becomes virtually fully dense with any remaining small volume fraction of porosity completely encapsulated. As a result, the substrate is completely protected from corrosion, and corrosion of the coating is limited to the exterior surface.

The discovery that such reactions are useful is surprising in view of the established art of infiltrating porous bodies or coatings while deliberately trying to avoid or minimize reactions; e.g., as in Goetzel, Breton, Patel, Gebaurer and Bourne. The reactive metals of this invention are also distinctly different than the self-fluxing alloys used in combination with metal carbides for plasma deposition, or even oxygen-acetylene spraying (Noguchi, ASM, Goetzel, etc.) in that the boron content is much higher for the plasma coatings (as deposited density 75 to 95 percent of theoretical). Retention and utilization of a high concentration of boron is distinctly different than the teachings of Schrewelius and Quaas who tried to ensure the removal of the boron during deposition to prevent detrimental effects. It is also distinctly different than the teaching and practice of self-fluxing alloys, since the boron in the reactive metals of this invention are intended to form hard phases such as borides and complex borocarbides and not be consumed as a flux.

The coating thicknesses in the two-layer method seem to be limited to those normally encountered in plasma or d-gun deposition; i.e., about 0.020 to 0.030 inches. This limitation is a function of specific composition, coating parameters, and substrate geometry and is due to the cumulative residual stresses generated during deposition. In the one-layer method, however, it has surprisingly been found that extremely thick coatings, often exceeding 0.100 inches, can be deposited. This significant advantage of the one-layer over the two-layer method is counterbalanced to some degree by the slightly harder coatings obtained with the same compositions with the two-layer method.

SPECIFIC EMBODIMENTS

One of the major compositional embodiments of this invention utilizes tungsten carbide as the metal carbide. When the two-layer method is used it consists of first applying a coating of tungsten carbide-cobalt by plasma or detonation gun deposition and then applying a second coating of a nickel-base reactive metal by plasma or d-gun deposition or by slurry, electrophoresis, etc., and finally heating the coated article in a vacuum or inert gas to a temperature sufficient (for example, about 950°–1200° C.) for the second coating to melt, penetrate the first coating and react with it. The composition of powder for the first coating is the equivalent of tungsten carbide and 0 to 25 cobalt. The specific carbon content may range from about 4.60 to 6.13 when stoichiometric WC is used or about 3.20 to 6.13 when part of the carbide is nonstoichiometric. It may contain up to 2.0 Fe and a reasonable amount of trace impurities. Thus, the first coating of tungsten carbide-cobalt may consist of a mixture of phases of WC, $W_2C$ and $M_6C$ ($Co_3W_3C$, etc.) with the balance of the cobalt in a metallic form. The composition of the powder for the second coating is 3.0 to 18.0 B, 0 to 6.0 Si, 0 to 20 Cr, 0 to 5.0 Fe and the balance Ni. The preferred ranges for the two coatings are for the first coating the equivalent of tungsten carbide-10 to 25 Co and for the second coating 6.0 to 11.0 B for plasma or 3.0 to 11.0 for d-gun, 2.0 to 4.0 Si, 3.0 to 15.0 Cr, 0 to 2.0 Fe and the balance Ni. It should be recognized that some shift in composition is possible during plasma or d-gun deposition. The ratio of the second coating to the first coating is a function of the specific alloy compositions used for each coating. In thickness, the ratio ranges from about 0.2 to 1.2 with a preferred range of 0.3 to 1.0. This corresponds to a weight ratio of about 0.09 to 0.65. The substrate composition for any of these coating systems may be any iron, nickel or cobalt base alloy.

When the metal carbide chosen is tungsten carbide and the one-layer method is used, the invention consists of depositing by plasma or d-gun deposition a coating composed of a mixture of two or more components. One component consists of essentially tungsten carbide-0 to 15 Co. This component may consist of a mixture of phases of WC, $W_2C$ and $M_6C$ ($Co_3W_3C$, etc.) with the balance of the cobalt in a metallic form. A small amount of iron or other elements may be present in this component. The specific carbon content may range from about 4.60 to 6.13 when stoichiometric WC is used to about 3.20 to 6.13 when part of the carbide is nonstoichiometric. It may contain up to 2.0 Fe and a reasonable amount of trace impurities.

The second component may be a single alloy or a mixture of alloys with a total composition of 3.0 to 18.0 B, 0 to 6.0 Si, 0 to 20.0 Cr, 0 to 5.0 Fe. An example of a mixture of alloys would be 40 to 60 wt.% of an alloy of 14.0 to 19.0 B, 0 to 3.5 Fe, 0 to 1.0 Si, balance nickel and 60 to 40 wt.% of an alloy of 2.0 to 4.0 B, 2.0 to 6.0 Si, 1.0 to 5.0 Fe, 0 to 20.0 Cr, balance nickel. The mixture of components consists of 75 to 55 percent of the first (tungsten carbide) component and 25 to 45 percent of the second (reactive metal) component. The coating may be applied to any iron, nickel or cobalt base alloy substrate.

After the coating is applied, the component is heat treated at a temperature of greater than 950° C. for a time sufficient to cause reaction and/or diffusion between the components of the coating. A limited, but important amount of diffusion/reaction occurs with the substrate.

The microstructures of the resulting coatings after heat treatment are very complex and are not fully understood. Coatings made by the two-layer method consists generally of four zones. The outermost zone contains some large, angular particles in a metallic matrix with a fine dispersion of very small particles, the second zone contains somewhat smaller angular particles than the outer zone and again a dispersion of very fine particles in a metallic matrix, the third zone consists of a gradient of particles in a metallic matrix, increasing from the substrate outward, and finally the fourth zone is a narrow band of interdiffusion/reaction with the substrate. X-ray analysis suggests that the predominate phases in the first three zones are as shown in Table I.

Table I

| Zone | Major Phases | Minor Phases | Hardness, $DPH_{300}$ |
|---|---|---|---|
| Outer | $W_2M'B_2$, $\eta$ | WC | 1300–2200 |
| Second | WC | $W_2M'B_2 + \eta$ | 1200–2000 |
| Third | $W_2M'B_2$, $\eta$ | WC | 300–700 |
| where | M' + Co, Ni | | |
| | $\eta = \eta_1 + \eta_2$ carbides | | |
| | ($M_6C$) | | |
| | $\eta_1 = M_4W_2C$ or $M_3W_3C$ | | |
| | $\eta_2 = M_2W_4C$ | | |

Typical hardness of the various zones are also shown in Table I.

The microstructures of coatings made by the one-layer method are also very complex and not completely understood. The outer major portion of the coating, consists of a dispersion of fairly coarse angular hard particles, presumably WC, and a very dense finer dispersion of several types of particles, all in a metallic matrix. A narrow inner zone consists of a substantial amount of a hard phase which may be present as large blocks of almost continuous particles or a fine dispersion of particles, depending on the specific composition and heat treatment used. Finally, there is a narrow interdiffusion zone between the coating and the substrate. Typical hardnesses of the outermost zone are 1000 to 1800 $DPH_{300}$.

A wide variety of other carbide systems can, of course, be used to advantage with this invention. For example, excellent microstructures and hardness have been obtained with the TiC and VC/WC systems. The optimum choice of a given carbide will depend on the specific wear and corrosion environment of use and the relative economics of the coating systems.

EXAMPLES

Several examples of this invention follow for the purpose of teaching one skilled in the art how to practice the invention. The examples are not in any way intended to limit the scope of the invention.

EXAMPLE 1

Specimens $\frac{1}{2} \times \frac{1}{2} \times 1$ inch of AISI 1018 steel (nominally 0.18 C; 0.75 Mn; Bal Fe) were first coated on a $\frac{1}{2} \times 1$ inch face with Alloy 1 to a thickness of 0.005 to 0.020 inches as shown in Table II.

Alloy 1 = W-11 Co-4.1 C (Tungsten carbides + cobalt)

Alloy 2 was then plasma sprayed over the first coating to various thicknesses as shown in Table II.

Alloy 2 = Ni—9.3 B—2.7 Si—3.2 Cr—2.3 Fe These coatings were then heat treated in vacuum for either one hour at 1100° C., one hour at 1160° C., or five minutes at 1160° C. The coatings after heat treatment had the hardnesses shown in Table II. It was found that the ratio of the second coating to the first coating is very important in developing the best microstructures in the final coating. If the amount of the second coating relative to the first coating is insufficient, the first coating will not be fully penetrated and the total coating not well bonded to the substrate. This occurred in the test specimens of all but the thinnest first coatings when the ratio was 0.30 or less by weight. Good microstructures were developed when the ratio was 0.35 or 0.40, although the 0.40 ratio was preferred since the 0.35 ratio tended to exhibit bands of metal-rich material that were softer than the balance of the coating. The hardness of the coatings with a ratio of 0.45 was lower than those with 0.35 or 0.40 except at the lower heat treatment temperature. The coatings heat treated at either 1100° or 1160° C. for one hour were similar with the exception of the 0.45 ratio coatings while those held at the shorter time for five minutes at 1160° C. had somewhat lower hardnesses. A review of the microstructures and the hardnesses indicate that the ratio by weight of 0.30 to 0.45 is useful, but that the ratio of about 0.35 to 0.40 is preferred.

See Table II.

Various ratios of thickness of second coating to first coating were used as shown in Table III. The coated specimens were then heat treated at 1100° to 1160° C. for 1 hour in vacuum. Because the heat treatment had not been optimized, there were some areas of high metallic content and low hardness; however, the predominant hardnesses are shown in Table III. The specific microstructures were found to be a function of the ratio of the second coating to the first coating. In the case of Alloy 3 it was found that all of the coatings had a porous outer layer and, under the conditions used, that the residual stress of the final coating was such that those coatings with a thickness ratio of second coating to first coating of greater than 0.8 lifted during coating. Those with a lower ratio exhibited some porosity in the outer zone of the coating. When Alloy 4 was used for the second coating, a much higher reactivity with the first coating and the substrate was observed. When a high Table II

| Coating Thickness (inches) | | Thickness Ratio 2:1 | Weight Ratio 2:1 | Hardness, DPH$_{300}$ | | |
|---|---|---|---|---|---|---|
| Alloy 1 | Alloy 2 | | | 1160° C./60m | 1160° C./5m | 1100° C./60m |
| .0050 | .0030 | .6 | .30 | 739–1790 | | 635–1397 |
|  | .0035 | .7 | .35 | 695–1897 | | 1488 |
|  | .0040 | .8 | .40 | 1574 | | 1697 |
|  | .0045 | .9 | .45 | 1510 | | 1542 |
| .010 | .0060 | .6 | .30 | 1724 | 1442 | 1552 |
|  | .0070 | .7 | .35 | 1746 | 1564 | 1591 |
|  | .0080 | .8 | .40 | 1527 | 1407 | 1591 |
|  | .0090 | .9 | .45 | 1296 | 1167 | 1447 |
| .015 | .0090 | .6 | .30 | 1635 | | 1641 |
|  | .0105 | .7 | .35 | 1512 | 1409 | 1602 |
|  | .0125 | .8 | .40 | 1310 | 1267 | 1534 |
|  | .0135 | .9 | .45 | 977 | 1071 | 1541 |
| .020 | .012 | .6 | .30 | 1443 | | 1597 |
|  | .014 | .7 | .35 | 1404 | | |
|  | .016 | .8 | .40 | 1142 | | 1489 |
|  | .018 | .9 | .45 | 901 | | 1217 |

EXAMPLE 2

Specimens $\frac{1}{2} \times \frac{1}{2} \times 1$ inch of AISI 1018 steel were first coated on $\frac{1}{2} \times 1$ inch face with Alloy 1 to the thicknesses shown in Table III with a plasma spray torch. A second coating was then applied over the first to the thicknesses shown in Table III also by plasma spray. The compositions used for the second coating layer were:

Alloy 3: Ni—7.0 Cr—3.5 B—4.5 Si—3.0 Fe
Alloy 4: Ni—15.6 B
Alloy 5: Ni—3.8 Cr—6.0 B—2.5 Si
Alloy 6: Ni—3.8 Cr—9.4 B ratio of second coating to first coating was used, extraordinarily large particles were found in the outer zone accompanied by a fairly wide range of hardness values in this zone. With lower ratios, or heat treatment temperature, however, more uniform microstructures were obtained with quite high uniform hardnesses. The use of Alloy 5 resulted in generally acceptable microstructures but with occasional high concentrations of infiltrant in the inner half of the coating at high second coating to first coating ratios. Alloy 6 when used as a second coating resulted in acceptable microstructures at all ratios, thus the presence of any significant amount of Si is not necessary.

See Table III.

Table III

| Second Coating* | Thickness Ratio 2nd ctg:1st ctg. | Weight Ratio 2nd ctg:1st ctg. | Hardness, DPH$_{300}$ | |
|---|---|---|---|---|
|  |  |  | 1160° C./60m | 1100° C./60m |
| Alloy 3 | 0.6 | 0.32 | 1422 | |
|  | 0.7 | 0.37 | 1446 | |
|  | 0.8 | 0.42 | 1663 | |
|  | 0.9 | 0.47 | 1575 | |
| Alloy 4 | 0.6 | 0.28 | 980 | 1704 |
|  | 0.7 | 0.32 | 1017 | |
|  | 0.8 | 0.37 | 837 | |
|  | 0.9 | 0.41 | 1330 | 2013 |
| Alloy 5 | 0.6 | 0.33 | 1790 | |
|  | 0.7 | 0.38 | 1860 | |
|  | 0.8 | 0.43 | 2228 | |
|  | 0.9 | 0.49 | 2013 | |
| Alloy 6 | 0.6 | 0.30 | 1682 | |
|  | 0.7 | 0.36 | 1768 | |

Table III-continued

| Second Coating* | Thickness Ratio 2nd ctg:1st ctg. | Weight Ratio 2nd ctg:1st ctg. | Hardness, $DPH_{300}$ 1160° C./60m | 1100° C./60m |
|---|---|---|---|---|
| | 0.8 | 0.41 | 1484 | |

*First coating .008 to .010 inches of Alloy 1.

EXAMPLE 3

Specimens ½×½×1 and ½×1×3 inches of AISI 1018 steel were coated on a ½×1 or 1×3 inches face with alloy 1 by plasma deposition to a thickness of about 0.009 inches and then a second coating with a total composition of Alloy 2 in Example 1, but consisting of a mixture of 50 percent Alloy 3 and 50 percent Alloy 4 was applied, also by plasma deposition, to a thickness corresponding to a thickness ratio of the second coating to the first coating of 0.81, 0.85, 0.90. These coatings were then heat treated for 60 or 120 minutes at 1100 or 60 minutes at 1150° C. The resulting microstructures for all the coatings were generally acceptable with hardnesses ranging from 1478 to 1597 $DPH_{300}$ except for the 0.9 ratio heat treated at 1150° C. for 60 min. (1304 $DPH_{300}$). There was little difference between the specimens except that those heat treated at 1150° C. were slightly softer than those heat treated at 1100° C. In all cases on the basis of the microstructures and the hardnesses of the coatings these specimens would be expected to have extremely good wear resistance.

EXAMPLE 4

The plungers used in stimulation pumps for oil well applications to pump sand slurrys undergo severe abrasion and normally have an extremely short service life. To determine the performance of the coatings of this invention vis-a-vis prior art coatings, the three plungers in a triplex pump were coated with three different materials: Colmonoy 6, a tradename of Wall-Colmonoy, Inc. (14 Cr—3.0 B—4.5 Si-4.5 Fe—0.7 C—balance nickel) applied by standard oxygen-acetylene hard facing techniques, LW-15 (WC-10Co-4Cr) a detonation gun coating applied by Union Carbide Corporation, and a coating of this invention. The plungers were 3.75 inches in diameter, about 19 inches long with a coated length of about 14 inches. The specific coating of this invention used for this test was produced by applying a first coating of Alloy 1 to a thickness of 0.011 inches. A second coating 0.0085 inches thick of 50 wt.% Alloy 3+50 wt.% of Alloy 4 was then applied. Both of these coatings were applied by plasma deposition. The plunger was then heat treated at 1100° C. in vacuum for 120 minutes. The coating was then ground and lapped leaving a final coating thickness of about 0.012 inches. The pump was assembled and run in typical field service until the Colmonoy 6 coating failed. At this point in time, the LW-15 appeared to be significantly worn, but in better condition than the Colmonoy 6. The coating of this invention, on the other hand, showed only an insignificant amount of wear and was assembled into another pump with two new Colmonoy 6 plungers. Again the pump was run until the Colmonoy 6 coating failed and again inspection revealed that the coating of this invention was still very serviceable. This sequence was repeated and it was found that the coating of this invention lasted four to six times as long as plungers coated with Colmonoy 6.

EXAMPLE 5

Specimens of a variety of sizes, shapes and compositions as shown in Table IV(b) were coated with a first coating of Alloy 1 and a second coating of a mixture of 50 wt.% of Alloy 3+50 wt.% of Alloy 4 to the thicknesses shown in Table IV(a). These coatings were then heat treated in vacuum at 1100° to 1200° C. for 15 to 120 minutes. Microstructures similar to those obtained previously with this coating system were obtained on all of the samples with the exception of minor differences in the diffusion zone, depending on the specific composition of the substrate. It has thus been demonstrated that these coatings are applicable to a wide variety of steel substrates.

See Tables IV(a) and IV(b) respectively.

Table IV(a)

| Steel Composition (given in Table IV(b)) | Size of Coated Surface (in) | Coating Processing Conditions | | | | Alloy 3&4/Alloy 1 Weight Ratio |
|---|---|---|---|---|---|---|
| | | Coating Thickness | | Heat Treatment | | |
| | | Alloy 1 (mils) | Alloy 3&4/Alloy 1 Thickness Ratio | Time (hr) | Temp. °C. | |
| M-2 | ½ × 1 | 8 | .8 | 1 | 1155 | 0.40 |
| D-2 | ½ × ½ | 8 | .8 | 1 | 1155 | 0.40 |
| Carb. 43B20 | 5 O.D. × 3 I.D. | 11 | .8 | 2 | 1100 | 0.40 |
| 1090 | 1 × 3 | 11 | .8 | 1 | 1100 | 0.40 |
| 1020 | ½ × 1, 1 × 3 | 4–11 | .7 to .94 | ¼ to 2 | 1035 to 1200 | 0.35–0.48 |
| 4140 | ½ × 1, 1 × 3, 2 × 2.5 | 4–11 | .7 to .94 | ¼ to 2 | 1100 to 1200 | 0.35–0.48 |
| 4340 | 1 dia. | 10 | .8 | 1 | 1165 | 0.40 |
| 8620 | 1 dia. | 10 | .8 | 1 | 1165 | 0.40 |

Table IV(b)

| Steel Compositions | 4340 | M-2 | D-2 | 4140 | 8620 | 1090 | 1020 | Carb. 43B20 | 1018 |
|---|---|---|---|---|---|---|---|---|---|
| C | 0.4 | 0.85 | 1.5 | 0.4 | 0.2 | 0.9 | 0.2 | 0.2 | 0.18 |
| Mn | 0.85 | — | — | 0.9 | 0.9 | 0.75 | 0.45 | 0.55 | 0.75 |
| Si | 0.20 | — | — | 0.3 | 0.3 | — | — | 0.3 | — |
| Cr | 0.75 | 4.0 | 12.0 | 0.95 | 0.5 | — | — | 0.5 | — |
| Ni | 1.80 | — | — | — | 0.55 | — | — | 1.80 | — |

Table IV(b)-continued

| Steel Compositions | 4340 | M-2 | D-2 | 4140 | 8620 | 1090 | 1020 | Carb. 43B20 | 1018 |
|---|---|---|---|---|---|---|---|---|---|
| Mo | 0.25 | 5.0 | 1.0 | 0.2 | 0.2 | — | — | 0.25 | — |
| W | — | 6.0 | — | — | — | — | — | — | — |
| V | — | 2.0 | — | — | — | — | — | — | — |
| B | — | — | — | — | — | — | — | 0.0005 min. | — |
| Fe | Bal | Bal | Bal | Bal | Bal | Bal | Bal | Bal | Bal |

EXAMPLE 6

Specimens ½×1×3 inches of AISI 1018 steel were plasma sprayed on a 1×3 inch surface with Alloy 1 to a thickness of 0.011 inches, then with a second coating of a 50:50 mixture of Alloys 3 and 4 to a thickness of 0.009 inches. The specimens were then heat treated at 1150° C. for 60 min. in vacuum. The coated surface was ground smooth and a dry sand abrasion test run. The coating of this invention lost slightly less volume of material than did Carboloy 883 (WC-6-CO, a tradename of General Electric Company), a sintered tungsten carbide material, and about one-fourth that of LW-1N30, a d-gun tungsten carbide-13 cobalt coating applied by Union Carbide Corporation.

EXAMPLE 7

Specimens of AISI 1018 steel 1×½×2¾ inches were coated 0.010 to 0.012 inches thick of Alloy 7

Alloy 7=W—9.50 Co—4.55 C (tungsten carbides+cobalt) with a d-gun on the 1×2¾ inches faces. Separate samples were then overcoated with a layer of Alloy 2 to thickness ratios of 0.3, 0.4, 0.5 and 0.6 or weight ratios of about 0.16, 0.21, 0.26 and 0.32, respectively. The test specimens were then heat treated in vacuum at 1110° to 1120° C. for two hours. The resultant microstructures were as previously described. The hardness of the coating was found to vary with the thickness ratio, being 1252, 1483, 1407 and 1249 for the 0.3, 0.4, 0.5 and 0.6 ratio coatings, respectively.

EXAMPLE 8

Specimens of 1×3×½ inches steel (AISA 1018) were plasma sprayed with mixtures of alloys 1, 3 and 4 as shown in Table V. The specimens were then heat treated in vacuum at temperatures ranging from 1065° to 1160° C. for times ranging from 5 to 240 min. The microstructure of coating A was quite porous and that of coating C not very uniform. Coating B, however, had a very uniform microstructure, minimal closed porosity and a hardness of 1200 to 1500 in the outer zone and 1113 to 1374 in the inner zone. These coatings could be applied to unusual thicknesses on a flat surface (greater than 0.030 inch) without lifting. A dry sand abrasion test of coating B resulted in about half the wear rate of a d-gun WC-Co coating and slightly greater than the wear rate of Carboloy 883, a pressed and sintered WC-Co.

Table V

| Coating | Composition |
|---|---|
| A | 67% Alloy 1 |
|  | 16.5% Alloy 3 |
|  | 16.5% Alloy 4 |
| B | 63.5% Alloy 1 |
|  | 18.25% Alloy 3 |
|  | 18.25% Alloy 4 |
| C | 60.0% Alloy 1 |
|  | 20.0% Alloy 3 |
|  | 20.0% Alloy 4 |

EXAMPLE 9

Specimens of AISI 1018 steel were plasma sprayed with mixtures of Alloy 1 and Alloy 2 in the ratios shown in Table VI to thicknesses of 0.060 to 0.063 inches. They were then heat treated in vacuum to 1050° to 1060° C. for 30 min. The hardness of the outer zone of the coatings is shown in Table VI. Coating D was somewhat porous, E less so and F, G, and H had only a very few small pores (all the pores were closed).

Table VI

| Coating | Composition, wt. % | | Hardness DPH₃₀₀ |
|---|---|---|---|
|  | Alloy 1 | Alloy 2 |  |
| D | 73 | 27 | 1452 |
| E | 70 | 30 | 1435 |
| F | 67 | 33 | 1265 |
| G | 65 | 35 | 1133 |
| H | 63.5 | 36.5 | 1189 |

EXAMPLE 10

Specimens ½×1×3 inches of 1018 AISI steel were coated on one 1×3 inches face with a mixture of 63.5% Alloy 1 and 36.5% Alloy 6 to a thickness of 0.030 inches. The specimens were then heat treated in vacuum at 1060° C. for 30 min. The resulting hardness was 1542 DPH₃₀₀. This demonstrates that, as in the case of the two-layer system, Si is not necessary in the one-layer system either.

EXAMPLE 11

Specimens of AISI 1018 steel tubes 4 inches in diameter, 6 inches long were coated with mixtures of Alloys 1, 3 and 4 to a thickness of 0.064 to 0.078 inches as shown in Table VII. The specimens were then heat treated in vacuum at 1060° C. for 30 min. The hardnesses of the outer zone of the resulting coatings is shown in Table VII.

Table VII

| Coating | Composition, wt. % | | | Hardness DPH₃₀₀ |
|---|---|---|---|---|
|  | Alloy 1 | Alloy 4 | Alloy 3 |  |
| I | 63.5 | 14.6 | 21.9 | 1278 |
| J | 63.5 | 18.25 | 18.25 | 1241 |
| K | 63.5 | 21.9 | 14.6 | 1117 |

EXAMPLE 12

Specimens ½×1×3 inches of AISI 1018 steel were plasma coated on a 1×3 inch face with a mixture of 18.25 percent of Alloy 3, 18.25 percent of Alloy 4 and the balance WC (a stoichiometric compound of W-6.13 C with no metal binder). A dense microstructure was obtained when the specimens were heat treated at 1040° C. for one hour in vacuum. The hardness of the coating was 1010 DPH$_{300}$.

EXAMPLE 13

Specimens $\frac{1}{4}\times1\times2$ inches of a nickel base alloy (Ni—22 Cr—18.5 Fe—9 Mo—1.5 Co—0.6 W—1.0 Si—1.0 Mn—0.10 C) and a cobalt base alloy (Co—22 Cr—22 Ni—14.5 W—1.25 Mn—0.35 Si—0.10 C—3.0 Fe—0.9 La) were plasma coated on a 1×2 inch face with a mixture of 18.25 percent Alloy 3, 18.25 percent Alloy 4 and the balance Alloy 7. Specimens were heat treated in vacuum at 1040° C. for 30 min., 1060° C. for 10 min., and 1060° C. for 30 min. Hardness values were 1160, 1177 and 1126 DPH$_{300}$, respectively for the coatings on the nickel base alloy and 1219, 1187 and 1228 DPH$_{300}$, respectively on the cobalt base alloy. The microstructure was similar to those obtained on steel substrates.

EXAMPLE 14

Seamless steel tubing 1 inch O.D.×6.5 inches long×0.120 inches wall thickness was coated on the O.D. with 0.010 inches of Alloy 1, followed by 0.7 to 0.8 thickness ratio (0.35 to 0.40 weight ratio) of Alloy 2 or a 50:50 wt.% mixture of Alloys 3 and 4. After heat treatment in vacuum for 2 hours at 1100° C., the tubes were cut into rings 0.5 in. long, and the steel substrate removed. The resultant rings of coating, 0.5 inches long by 1.0 inches O.D., were subjected to corrosive attack by submersion in aqueous solutions of each of the following media, 50 wt.% NaOH, 5 wt.% 3, 5 wt.% H$_2$SO$_4$ and 20 wt.% HCl. Tests were conducted at room temperature and at the respective boiling points of the solutions for a period of 5 to 9 days. In most cases, little or no corrosive attack (<0.001") on the external surface of the coating could be observed. The most severe attack was observed in boiling HNO$_3$ solution, where a uniform scale of corrosion products 0.004 in. thick had developed after 7 days exposure. There was no evidence of internal corrosive attack leading from the external coated surface in any of the samples tested.

EXAMPLE 15

Specimens of $\frac{1}{2}\times1\times3$ inches AISI 1018 steel were plasma deposited with blended mixtures of (75/25 VC/WC)+2 Ni+2 Mo and a mixture of 50 wt.% Alloy 3 and 50 wt.% Alloy 4, then heat treated at various times and temperatures. Coatings that contained 50–55 wt.% of the mixture of Alloys 3 and 4 resulted in relatively fine microstructures and hardness values of 1150 to 1250 DPH$_{300}$ when heat treated at 1050° or 1060° C. for 10 minutes.

EXAMPLE 16

Specimens of $\frac{1}{2}\times1\times3$ inches AISI 1018 steel were plasma deposited with blended mixtures of TiC and a mixture of 50 wt.% Alloy 3 and 50 wt.% Alloy 4. Coatings that contained 45 or 50 wt.% TiC and were heat treated at 1020° or 1030° C. for $\frac{1}{2}$ hour in vacuum yielded hardness values of 1050–1200 DPH$_{300}$.

What is claimed is:

1. A powder composition for deposition by a method producing a coating having an as-deposited density greater than 75 percent theoretical on a metal substrate, such coating having high wear and corrosion resistance comprising two or more components
    (a) the first component consisting of 0–25 wt.% of at least one binder taken from the class consisting of cobalt, iron, nickel and alloys thereof and at least one metal carbide taken from the class consisting of tungsten, chromium, vanadium, hafnium, titanium, zirconium, niobium, molybdenum, tantalum carbides, and compounds thereof;
    (b) the second component consisting essentially of a single alloy or a mixture of alloys with a total composition of 6.0 to 18.0 wt.% boron; 0–6 wt.% silicon; 0–20 wt.% chromium; 0–5 wt.% iron; balance nickel;
said first component comprising 40–75 wt.% of the entire composition.

2. A powder composition for deposition over a metal carbide coating having a density greater than 75 percent theoretical on a metallic substrate, such powder consisting essentially of a single alloy or a mixture of alloys with a total composition of 6.0 to 18.0 wt.% B; 0–6 wt.% Si; 0–20 wt.% Cr; 0–5 wt.% Fe; balance nickel.

3. A powder composition according to claim 1 wherein the metal carbide is tungsten carbide.

4. A powder composition according to claim 1 wherein the metal carbide is titanium carbide.

5. A powder composition according to claim 1 wherein the metal carbide is vanadium carbide.

6. A powder composition according to claim 1 wherein the metal carbide is a mixture and/or compound of vanadium carbide and tungsten carbide.

7. A powder composition according to claim 3 wherein the tungsten carbide is formed from 3.20 to 6.13 wt.% carbon; balance tungsten.

8. A powder composition according to claim 3 wherein the tungsten carbide is 75–55 wt.% of the total composition.

9. A powder composition according to claim 1 wherein the metal carbide is tungsten carbide and the boron content of the powder is 6–11 wt.%.

10. A method for producing a coating on a metallic substrate, such coating having high wear and corrosion resistance comprising
    (a) depositing by a method capable of producing a coating having an as-deposited density greater than 75 percent theoretical, a composition comprising two or more components; the first component consisting of 0–25 wt.% of at least one binder taken from the class consisting of cobalt, iron, nickel and alloys thereof and at least one metal carbide taken from the class consisting of tungsten, chromium, vanadium, hafnium, titanium, zirconium, niobium, molybdenum, tantalum carbides, and compounds thereof; the second component consisting essentially of a single alloy or a mixture of alloys with a total composition of 6.0 to 18.0 wt.% boron; 0–6 wt.% silicon; 0–20 wt.% chromium; 0–5 wt.% iron; balance nickel; said first component comprising 40–75 wt.% of the entire composition;
    (b) heating such deposited coating at a temperature greater than 950° C. and for a time sufficient to cause substantial melting of said second component and reaction of said second component with a substantial portion of said first component;
    (c) cooling the coating allowing the formation of borides, carbides and intermetallic phases resulting in a coating having a hardness greater than 1000 DPH$_{300}$ and being virtually fully dense with no interconnected porosity.

11. A method according to claim 12 wherein step (a) is carried out by the plasma technique and the deposited coating has a density greater than 75 percent of theoretical.

12. A method according to claim 10 wherein step (a) is carried out by the d-gun technique and the deposited coating has a density of greater than 95 percent theoretical.

13. A method for producing a coating on a metallic substrate, such coating having high wear and corrosion resistance comprising
   (a) depositing by a method capable of producing a coating having an as-deposited density greater than 75 percent theoretical, a composition consisting of 0–25 wt.% of at least one of a binder taken from the class consisting of cobalt, iron, nickel and alloys thereof and at least one metal carbide taken from the class consisting of tungsten, chromium, vanadium, hafnium, titanium, zirconium, niobium, molybdenum, tantalum carbides, and compounds thereof;
   (b) depositing over said coating deposited by step (a) a composition consisting essentially of a single alloy or a mixture of alloys with a total composition of 6.0 to 18.0 wt.% boron; 0–6 wt.% silicon; 0–20 wt.% chromium; 0–5 wt.% iron; balance nickel;
   (c) heating the so-deposited coating of steps (a) and (b) at a temperature greater than 950° C. and for a time sufficient to cause the coating of step (b) to penetrate and react with the coating of step (a); and
   (d) cooling the coating allowing the formation of borides, carbides and intermetallic phases resulting in a coating having a hardness greater than 1000 $DPH_{300}$ and being virtually fully dense with no interconnected porosity.

14. A method according to claim 13 wherein step (a) is performed by the plasma technique.

15. A method according to claim 13 wherein step (a) is performed by the d-gun technique.

16. A method according to claim 13 wherein the binder is cobalt and the metal carbide is tungsten carbide and the weight ratio of the coating of step (b) to the coating of step (a) is 0.09 to 0.65.

17. A method according to claim 16 wherein the cobalt is 10–25 wt.% and the tungsten carbide is 90 to 75 wt.% of the coating deposited by step (a).

18. A method according to claim 17 wherein the coating deposited by step (a) is deposited by the plasma technique and the composition of the coating deposited by step (b) is 6.0 to 11.0 boron; 2.0 to 4.0 Si; 3.0 to 15.0 Cr; 0 to 2.0 Fe; and the balance Ni.

19. A method according to claim 17 wherein the coating deposited by step (a) is deposited by the d-gun technique and the composition of the coating deposited by step (b) is 6.0 to 11.0 boron; 2.0 to 4.0 Si; 3.0 to 15.0 Cr; 0 to 2.0 Fe and the balance Ni.

20. A method according to claim 16 wherein the weight ratio is 0.35 to 0.40.

21. A coating on a metallic substrate, said coating consisting of an interdiffusion zone with said substrate, and intermediate zone consisting of a gradient of borides, carbides and intermetallics in a metal matrix and a hard outer zone which may consist of one or more layers, said outer zone containing large, angular borides, carbides and intermetallic particles, and having a hardness of 1000 to 2200 $DPH_{300}$.

* * * * *